United States Patent
Oyabu

(10) Patent No.: US 10,264,505 B2
(45) Date of Patent: Apr. 16, 2019

(54) COMMUNICATION SYSTEM, AND BASE STATION, FOR DETECTING MALFUNCTION OF A RELAY STATION

(71) Applicant: KYOCERA CORPORATION, Kyoto (JP)

(72) Inventor: Takahiro Oyabu, Hachio-ji (JP)

(73) Assignee: KYOCERA Corporation, Kyoto (JP)

(*) Notice: Subject to any disclaimer, the term of this patent is extended or adjusted under 35 U.S.C. 154(b) by 43 days.

(21) Appl. No.: 15/348,222

(22) Filed: Nov. 10, 2016

(65) Prior Publication Data

US 2017/0142634 A1   May 18, 2017

(30) Foreign Application Priority Data

Nov. 13, 2015 (JP) ................................ 2015-223391

(51) Int. Cl.
| | |
|---|---|
| H04B 7/14 | (2006.01) |
| H04W 36/30 | (2009.01) |
| H04W 36/00 | (2009.01) |
| H04W 84/04 | (2009.01) |

(52) U.S. Cl.
CPC ...... *H04W 36/305* (2018.08); *H04W 36/0061* (2013.01); *H04W 84/047* (2013.01)

(58) Field of Classification Search
CPC .. H04W 40/22; H04W 24/08; H04W 36/0061
See application file for complete search history.

(56) References Cited

U.S. PATENT DOCUMENTS

| | | | |
|---|---|---|---|
| 2008/0125125 A1* | 5/2008 | Choi | H04W 36/0083 455/436 |
| 2011/0124330 A1* | 5/2011 | Kojima | H04W 36/32 455/424 |

(Continued)

FOREIGN PATENT DOCUMENTS

| | | |
|---|---|---|
| JP | H07-193856 A | 7/1995 |
| JP | 2001-109980 A | 4/2001 |

(Continued)

OTHER PUBLICATIONS

Takada et al.; "A Diagnostic Method for Network Management on Ubiquitous Wireless Sensor Networks"; IEICE Technical Report; Feb. 23, 2006; pp. 37-42; vol. 105, No. 628; The Institute of Electronics, Information and Communication Engineers; Japan.

*Primary Examiner* — Adbelnabi O Musa
(74) *Attorney, Agent, or Firm* — Studebaker & Brackett PC

(57) ABSTRACT

A communication system includes a destination base station that performs wireless communication with a terminal and is a communication destination; a neighboring base station; and a relay station that relays the wireless communication between the terminal and the destination base station. The relay station notifies the destination base station of information on the neighboring base station capable of communicating wirelessly with the relay station, as neighboring base station information, wherein when wireless communication between the destination base station and the relay station is disconnected, the destination base station makes an inquiry to the neighboring base station with reference to the neighboring base station information, and wherein the destination base station determines that abnormality has occurred in the relay station when wireless communication between the relay station and the neighboring base station is not confirmed.

5 Claims, 5 Drawing Sheets

(56) References Cited

U.S. PATENT DOCUMENTS

| | | | | |
|---|---|---|---|---|
| 2013/0059590 A1* | 3/2013 | Teyeb | ............... | H04W 36/0061 |
| | | | | 455/438 |
| 2013/0100826 A1 | 4/2013 | Namba et al. | | |
| 2013/0229942 A1* | 9/2013 | Kubota | ................. | H04W 36/22 |
| | | | | 370/252 |
| 2013/0267223 A1* | 10/2013 | Tajima | ............... | H04W 76/028 |
| | | | | 455/423 |
| 2014/0112240 A1* | 4/2014 | Takahashi | ............. | H04W 40/36 |
| | | | | 370/315 |
| 2014/0135015 A1* | 5/2014 | Liu | ...................... | H04W 36/22 |
| | | | | 455/436 |
| 2014/0187244 A1* | 7/2014 | Masini | ................. | H04W 36/10 |
| | | | | 455/436 |
| 2014/0206354 A1* | 7/2014 | Yasuoka | ................. | H04B 7/15 |
| | | | | 455/436 |

FOREIGN PATENT DOCUMENTS

| | | |
|---|---|---|
| JP | 2003-258702 A | 9/2003 |
| JP | 2007-124148 A | 5/2007 |
| JP | 2008-182409 A | 8/2008 |
| JP | 2012-015867 A | 1/2012 |
| JP | 2013-102361 A | 5/2013 |

\* cited by examiner

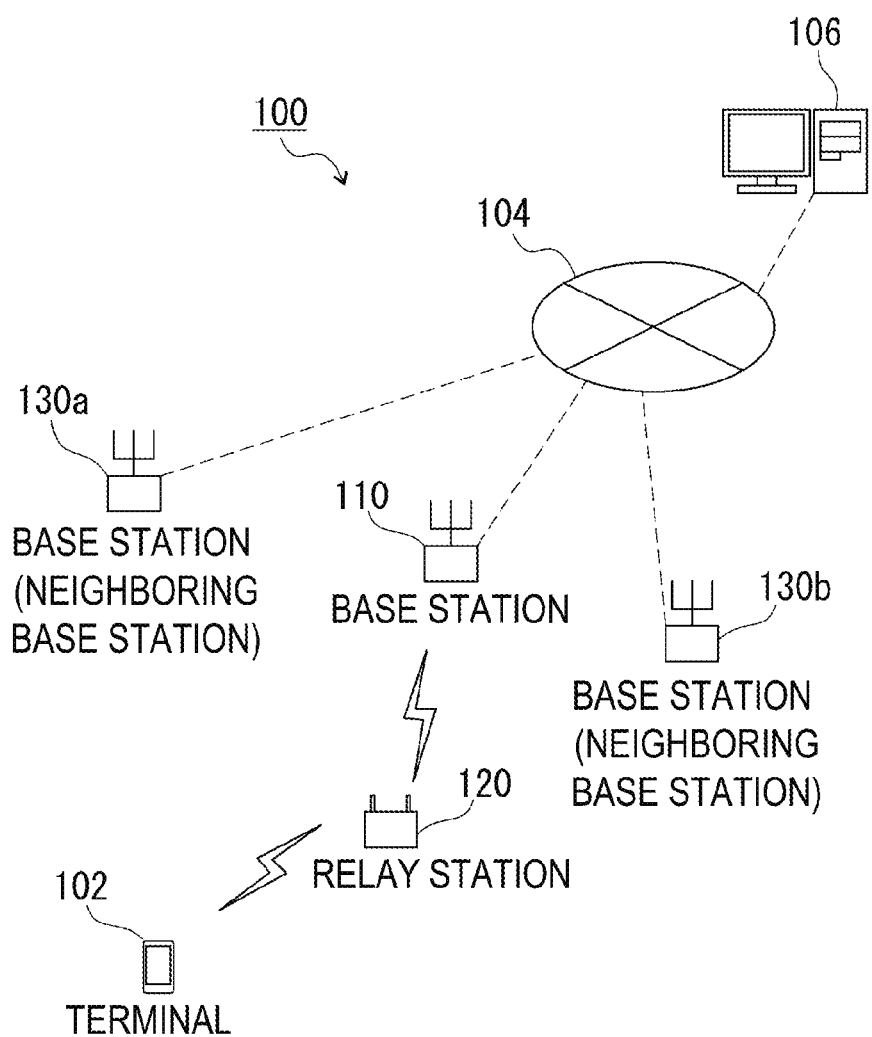

COMMUNICATION SYSTEM, AND BASE STATION, FOR DETECTING MALFUNCTION OF A RELAY STATION

CROSS-REFERENCE TO RELATED APPLICATION

This application claims priority from Japanese Patent Application No. 2015-223391 filed on Nov. 13, 2015, the entire subject matter of which is incorporated herein by reference.

TECHNICAL FIELD

This disclosure relates to a communication system including a base station that performs wireless communication with a terminal and a relay station that relay the wireless communication.

BACKGROUND

In general, a terminal such as a smart phone or a wireless device is connected to a network through a base station. In commercial facilities or underground passages, where radio waves hardly reach, and mountainous regions, where an ISDN line or an optical line for a base station is difficult to be laid, there is a case where a relay station is installed to relay wireless communication between a base station and a wireless terminal. The relay station includes a terminal-side communication unit and a base station-side communication unit, the terminal-side communication unit communicates with the terminal, and the base station-side communication unit communicates with the base station, whereby the communication between the base station and the terminal is relayed (for example, see JP-A-2012-15867).

SUMMARY

This disclosure is to provide a communication system in which abnormality of the relay station can be early detected, a base station, and a relay station.

A communication system according to this disclosure: a destination base station that performs wireless communication with a terminal and is a communication destination; a neighboring base station; and a relay station that relays the wireless communication between the terminal and the destination base station, wherein the relay station notifies the destination base station of information on the neighboring base station capable of communicating wirelessly with the relay station, as neighboring base station information, wherein when wireless communication between the destination base station and the relay station is disconnected, the destination base station makes an inquiry to the neighboring base station with reference to the neighboring base station information, and wherein the destination base station determines that abnormality has occurred in the relay station when wireless communication between the relay station and the neighboring base station is not confirmed.

In the above communication system, when the wireless communication between the relay station and the neighboring base station is not confirmed, the destination base station and the neighboring base station may increase a transmission output.

In the above communication system, wherein when the destination base station and the neighboring base station increase the transmission output, the transmission output may be set based on reception intensity or reception quality of radio waves received by the relay station from the destination base station and the neighboring base station.

According to this disclosure, it is possible to provide the communication system in which abnormality of the relay station can be early detected, the base station, and the relay station.

BRIEF DESCRIPTION OF THE DRAWINGS

The foregoing and additional features and characteristics of this disclosure will become more apparent from the following detailed descriptions considered with the reference to the accompanying drawings, wherein:

FIG. 1 is a diagram illustrating a communication system according to an embodiment;

DETAILED DESCRIPTION

Figure 2A:
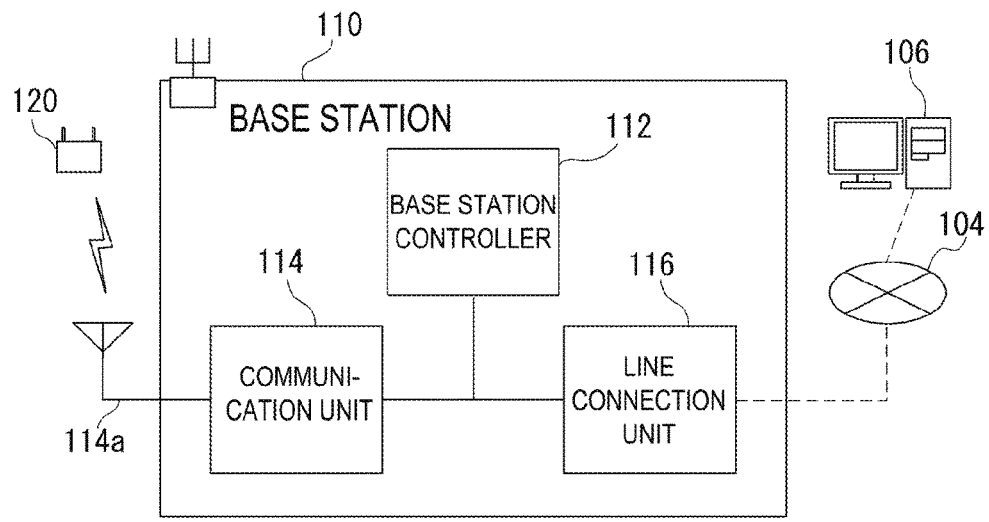
FIGS. 2A and 2B are functional block diagrams illustrating a schematic configuration of a base station and a relay station.

Hereinafter, a preferred embodiment of this disclosure will be described in detail with reference to the appended drawings. The sizes, materials, other specific numerical values described in the embodiment are merely examples to facilitate the understanding of this disclosure and this disclosure is not limited thereto unless otherwise stated. Throughout the specification and the drawings, the same reference numerals are given to elements having substantially the same functions and configurations, the repeated description thereof is omitted, and elements directly unrelated to this disclosure are not illustrated FIG. 1 is a diagram illustrating a communication system 100 according to this embodiment. As illustrated in FIG. 1, the communication system 100 according to this embodiment is configured to include a base station 110 that performs wireless communication with a terminal 102 and a relay station 120 that relays the wireless communication between the terminal 102 and the base station 110. In addition, neighboring base stations 130a and 130b are disposed around the relay station 120 to be capable of performing wireless communication with the relay station 120. The base station 110 and the neighboring base stations 130a and 130b are connected to a server 106 through a communication network 104 (network).

Figure 2B:
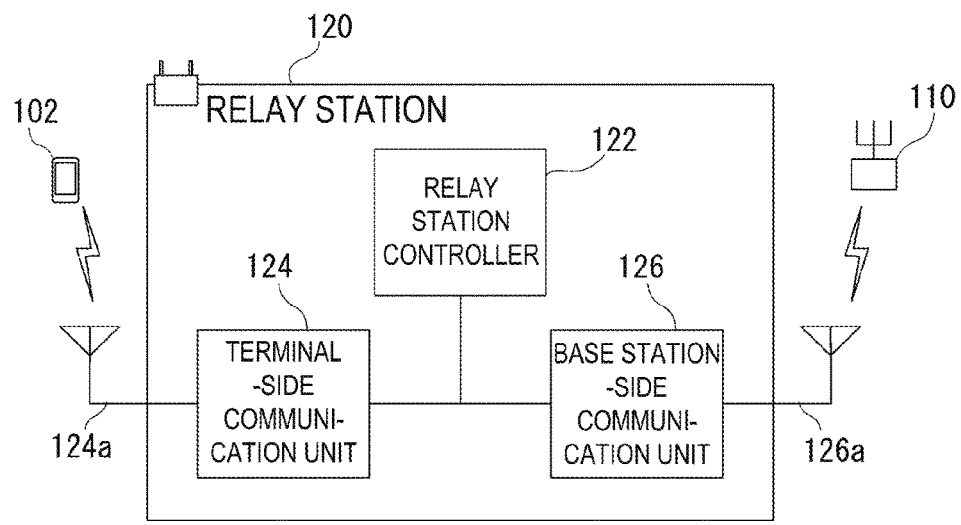

FIGS. 2A and 2B are functional block diagrams illustrating a schematic configuration of the base station 110 and the relay station 120. As illustrated in FIG. 2A, the base station 110 is configured to include a base station controller 112, a communication unit 114, and a line connection unit 116. The base station controller 112 is configured with a semiconductor integrated circuit including a central processing unit (CPU), and manages and controls the entire base station 110.

The communication unit 114 is connected to an antenna 114a, and transmits and receives (communicates) signals to/from the relay station 120 or the terminal 102 (the relay station 120 in FIG. 2A) through such an antenna 114a. The line connection unit 116 is connected to the communication network 104, and transmits and receives information to/from the server 106 through the communication network 104.

As illustrated in FIG. 2B, the relay station 120 is configured to include a relay station controller 122, a terminal-side communication unit 124, and a base station-side communication unit 126. The relay station controller 122 is configured with a semiconductor integrated circuit including a central processing unit (CPU), and manages and controls the entire relay station 120.

The terminal-side communication unit 124 is connected to an antenna 124a, and transmits and receives signals to/from the terminal 102 through the antenna 124a. The base station-side communication unit 126 is connected to an antenna 126a, and transmits and receives signals to/from the base station 110 through the antenna 126a.

Figure 3:
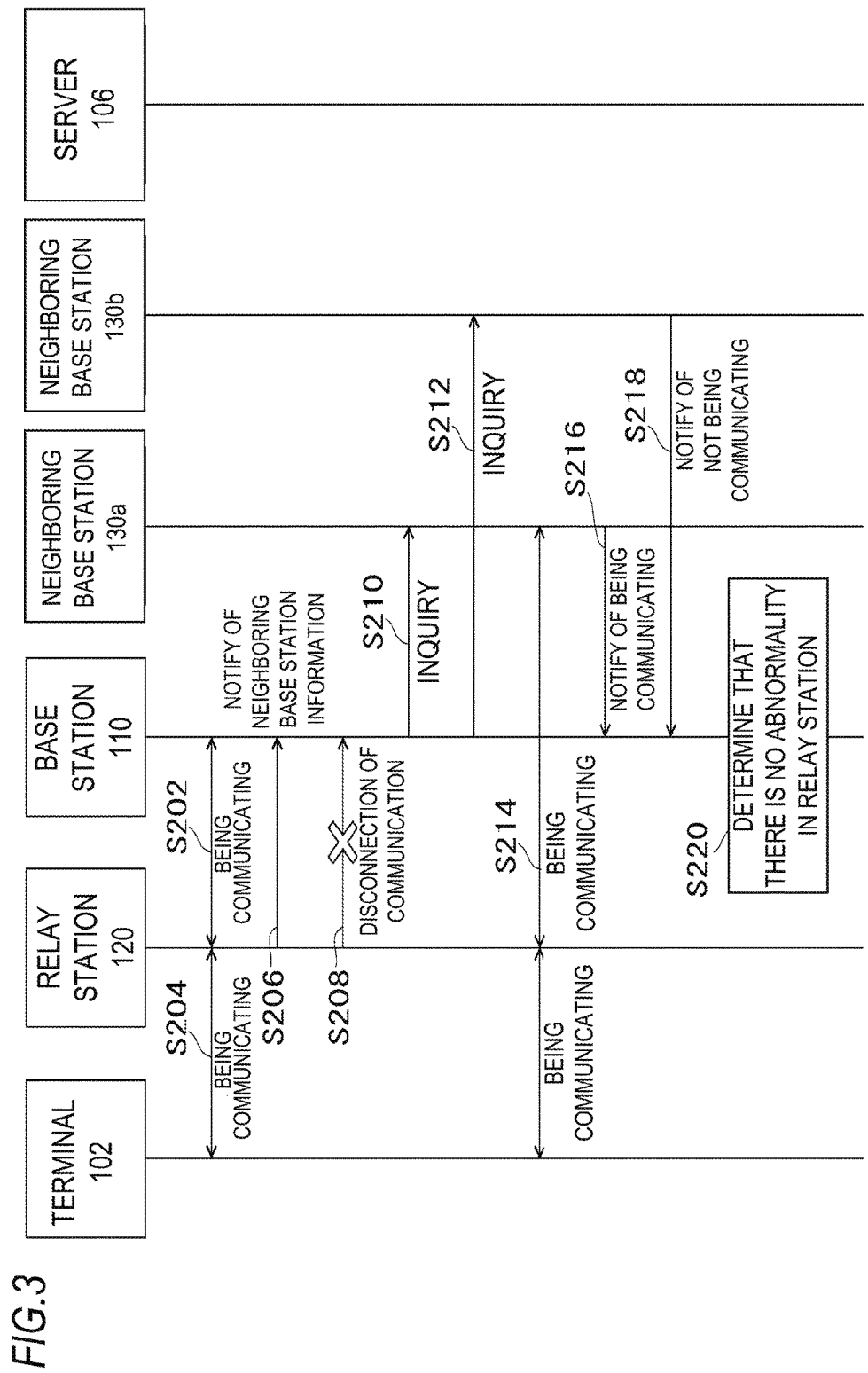
FIG. 3 is a sequence diagram illustrating the communication system when the relay station of the embodiment is connected to another base station.
Figure 4:
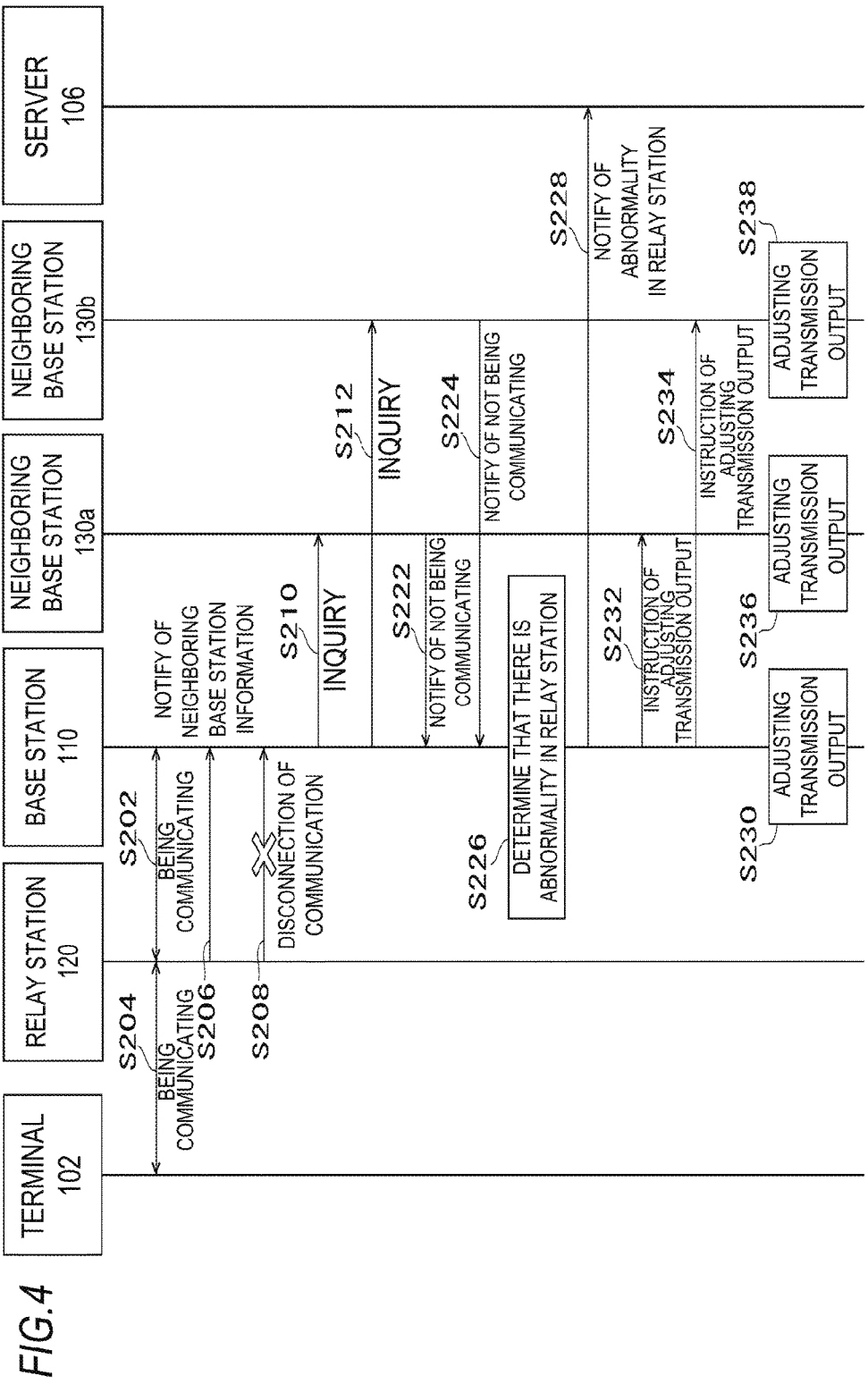
FIG. 4 is a sequence diagram illustrating the communication system when abnormality occurs in the relay station according to the embodiment.

FIGS. 3 and 4 sequence diagrams illustrating the communication system 100 according to this embodiment. In FIGS. 3 and 4, the same operation is denoted by the same reference numeral, and the description thereof will not be presented.

FIG. 3 illustrates an example in which the relay station 120 is connected to another base station (neighboring base station 130a). In FIG. 3, the base station 110 communicates wirelessly with the relay station 120 (step S202), and the relay station 120 communicates wirelessly with the terminal 102 (step S204). Thus, the wireless communication between the base station 110 and the terminal 102 is relayed through the relay station 120. During this time, in the communication system 100 according to this embodiment, the relay station 120 notifies the base station 110 being a communication destination of information on the neighboring base stations 130a and 130b capable of communicating wirelessly with the relay station 120, as neighboring base station information (step S206).

Thereafter, when the wireless communication with the relay station 120 is disconnected (step S208), the base station 110 being a communication destination makes an inquiry to the neighboring base stations 130a and 130b with reference to the neighboring base station information (steps S210 and S212). At this time, for example, when the neighboring base station 130a of the neighboring base stations 130a and 130b communicates wirelessly with the relay station 120 (step S214), the neighboring base station 130a notifies the base station 110 of the fact that it is communicating wirelessly with the relay station 120 (step S216).

On the other hand, the neighboring base station 130b not communicating wirelessly with the relay station 120 notifies the base station 110 of the fact that it is not communicating with the relay station 120 (step S218). Thus, the relay station 120 changes a communication destination to the neighboring base station 130, and the base station 110 determines that the disconnection of the wireless communication due to abnormality does not occur, that is, there is no abnormality in the relay station 120 (step S220).

In steps S210 and S212, the inquiry may be made to the neighboring base stations 130a and 130b after waiting of a predetermined time required for re-connection to the relay station 120. This is because there is a possibility that the connection to the neighboring base stations 130a and 130b is performed at a subsequent time even when the inquiry is made immediately after the disconnection.

FIG. 4 illustrates an example in which abnormality has occurred in the relay station 120. In FIG. 4, after the wireless communication between the base station 110 and the relay station 120 is disconnected (step S208), neither of the neighboring base stations 130a and 130b communicates wirelessly with the relay station 120. For this reason, each of the neighboring base stations 130a and 130b notifies the base station 110 of the fact that it is not communicating with the relay station 120 (steps S222 and S224). Accordingly, the wireless communication between the relay station 120 and the neighboring base stations 130a and 130b (another base station) is not confirmed, the base station 110 determines that abnormality has occurred in the relay station 120 (step S226). Then, the base station 110 notifies the server 106 of the fact that the abnormality has occurred in the relay station 120 (step S228).

In step S206, the relay station 120 may notify the base station 110 being a communication destination of information on the neighboring base stations 130a and 130b communicable wirelessly with the relay station 120, for example, neighboring base station information, at regular time intervals. In addition, the relay station 120 may notify the base station 110 being a communication destination of the neighboring base station information when the neighboring base station communicable wirelessly with the relay station 120 is changed.

Additionally, in the above step S226, the wireless communication between the relay station 120 and the neighboring base stations 130a and 130b (another base station) is not confirmed, and then the base station 110 determines that the abnormality has occurred in the relay station 120. However, the base station 110 may make an inquiry to the neighboring base stations 130a and 130b with reference to the neighboring base station information after waiting of a predetermined time so as to perform steps S210 to S226 again.

As described above, according to the communication system 100 of this embodiment, the base station 110 communicating wirelessly with the relay station 120 makes an inquiry to the neighboring base stations 130a and 130b when the wireless communication between the base station 110 and the relay station 120 is disconnected. Then, the base station 110 can determine the presence or absence of abnormality of the relay station 120 based on whether such a neighboring base stations 130a and 130b communicates wirelessly with the relay station 120. That is, according to the communication system 100 of this embodiment, since the disconnection of the wireless communication between the base station 110 and the relay station 120 can be determined by the base station 110, it is possible to early detect the abnormality of the relay station 120 without increasing a load of the server 106.

In the communication system 100 of this embodiment, as illustrated in FIG. 4, when the wireless communication between the relay station 120 and the neighboring base stations 130a and 130b is not confirmed, the base station 110 transmits transmission output adjustment instruction to the neighboring base stations 130a and 130b (steps S232 and S234). Then, the base station 110 and the neighboring base stations 130a and 130b adjust a transmission output thereof such that the transmission output increases (steps S230, S236, and S238).

The neighboring base station information notified from the relay station 120 (step S206) includes a list of the neighboring base stations from which radio waves can be received by the relay station 120. This means that these base stations can make the radio waves reach the position of the relay station 120.

Therefore, when the transmission output of the base station 110 and the neighboring base stations 130a and 130b included in the neighboring base station information is adjusted to be increased, the communication area of the relay station 120 can be covered by the base station 110 and the neighboring base stations 130a and 130b. Accordingly, even when the relay station 120 is abnormally disconnected, it is possible to prevent occurrence of a communication disable area and to provide a stable communication service.

Furthermore, the operation of covering of the communication area can be autonomously performed by the base station 110 and the neighboring base stations 130a and 130b without waiting for instruction from the server 106. Therefore, it is possible to quickly process the operation without causing the increase or delay of resources due to unitary management.

Figure 5A:
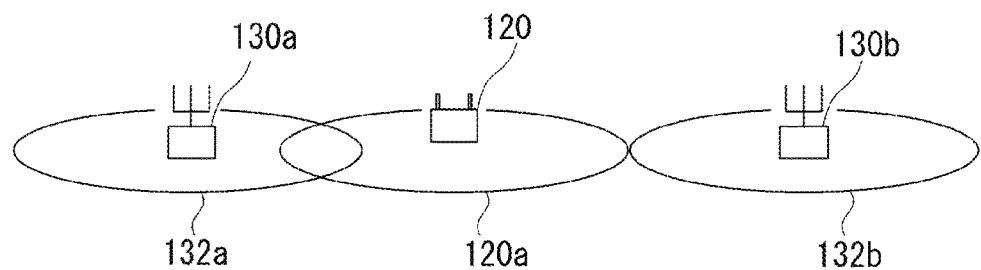
FIGS. 5A and 5B are diagrams illustrating setting of a transmission output.
Figure 5B:
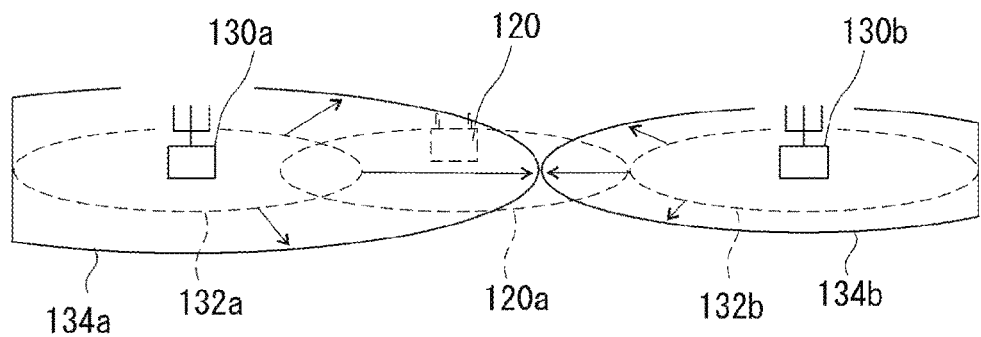

FIGS. 5A and 5B are diagrams illustrating setting of the transmission output; FIG. 5A illustrates a case where the relay station 120 is operating; and FIG. 5B illustrates a case where the relay station 120 is stopped by malfunction. In FIGS. 5A and 5B, it is assumed that the neighboring base station 130a is located closer to the relay station 120 and the neighboring base station 130b is located far from the relay station 120 compared to the neighboring base station 130a. In FIGS. 5A and 5B, the relay station 120 and the neighboring base stations 130a and 130b are illustrated as an example, but the base station 110 may be naturally included.

As illustrated in FIG. 5A, when the relay station 120 is operating, the relay station 120 and the neighboring base stations 130a and 130b perform transmission with an output for covering communication areas 120a, 132a, and 132b thereof, respectively. Then, as illustrated in FIG. 5B, when the relay station 120 is stopped, the transmission outputs of the neighboring base stations 130a and 130b are increased to cover the communication area 120a of the relay station 120.

Particularly, in the example illustrated in FIG. 5B, the transmission output of the neighboring base station 130a closer to the relay station 120 is increased greater than that of the neighboring base station 130b located far from the relay station 120. That is, the transmission outputs of the neighboring base stations 130a and 130b are controlled such that the communication area 134a of the neighboring base station 130a is wider than the communication area 134b of the neighboring base station 130b. Thus, it is possible to cover the communication area 120a of the relay station 120 while minimizing the increase in the overall power consumption.

In the examples illustrated in FIGS. 5A and 5B, there is a difference in transmission output based on whether a distance is close or far as a standard of setting of the transmission output during the increase of the transmission output. This distance may be a physical distance due to a layout design of the base station or GPS, or may use reception intensity of radio waves received by the relay station from each base station. In addition, reception quality is used instead of the distance or the intensity of radio wave, or a combination thereof can be used.

The preferred embodiment of this disclosure has been described above with reference to the appended drawings, but it is regardless to say that this disclosure is not limited to related examples. It is apparent to those skilled in the art that various modifications or corrections can be achieved within the scope described in the claims and it is, of course, construed that the modifications and corrections are included within the technical scope of this disclosure.

The steps in the wireless communication relay method according to the disclosure are not necessarily be processed chronologically in the order described in the flowchart or the sequence diagram and may include processes executed in parallel or in subroutines.

This disclosure is applicable to the communication system including the base station that performs the wireless communication with the terminal and the relay station that relays the wireless communication.

What is claimed is:

1. A communication system comprising:
   a destination base station that performs wireless communication with a terminal and is a communication destination;
   a plurality of neighboring base stations; and
   a relay station that
      relays the wireless communication between the terminal and the destination base station, and
      transmits, to the destination base station, neighboring base station information including information whether each of the plurality of neighboring base stations is capable of establishing a wireless communication with the relay station,
   the destination base station is configured to
      detect a disconnection of a wireless communication between the destination base station and the relay station,
      after the destination base station detects the disconnection, transmit, to the each of the plurality of neighboring base stations, an inquiry whether a respective neighboring base station is connected with the relay station through wireless communication between the respective neighboring base station and the relay station, based on the neighboring base station information, and
      receive, from the each of the plurality of neighboring base stations, a response whether the respective neighboring base station is connected with the relay station through the wireless communication between the respective neighboring base station and the relay station,
   the destination base station determines that a malfunction of the relay station has occurred, when there is no response, from the plurality of the neighboring base stations, that the respective neighboring base station is connected with the relay station through the wireless communication between the relay station and the respective neighboring base station, in response to the transmitted inquiry, and
   the destination base station determines that a malfunction of the relay station has not occurred, when there is at least one response from the plurality of the neighboring base stations, that the respective neighboring base station is connected with the relay station through the wireless communication between the relay station and the respective neighboring base station, in response to the transmitted inquiry.

2. The communication system according to claim 1, wherein when there is no response, the destination base station and the neighboring base station increase a transmission output.

3. The communication system according to claim 2, wherein when the destination base station and the neighboring base station increase the transmission output, the transmission output is set based on reception intensity or reception quality of radio waves received by the relay station from the destination base station and the neighboring base station.

4. A base station that serves as a communication destination of a relay station relaying wireless communication, comprising:

a controller; and a communication unit, that is controlled by the controller to communicate the relay station, the communication unit receives neighboring base station information including information whether each of a plurality of neighboring base stations is capable of establishing a wireless communication with the relay station, from the relay station, the communication unit is configured to detect a disconnection of a wireless communication between the destination base station and the relay station, after the communication unit detects the disconnection, transmit, to the each of the plurality of neighboring base stations, an inquiry whether a respective neighboring base station is connected with the relay station through wireless communication between the respective neighboring base station and the relay station, based on the neighboring base station information, and receive, from the each of the plurality of the neighboring base stations, a response whether the respective neighboring base station is connected with the relay station through the wireless communication between the respective neighboring base station and the relay station, the controller determines that a malfunction of the relay station has occurred, when there is no response, from the plurality of neighboring base stations, that the respective neighboring base station is connected with the relay station through the wireless communication between the relay station and the neighboring base station, in response to the transmitted inquiry, and the controller determines that a malfunction of the relay station has not occurred, when there is at least one response from the plurality of the neighboring base stations, that the respective neighboring base station is connected with the relay station through the wireless communication between the relay station and the respective neighboring base station, in response to the transmitted inquiry.

5. A relay station that relays wireless communication between a terminal and a destination base station being a communication destination, comprising:

a controller; and a communication unit, that is controlled by the controller to communicate at least one of the terminal and the destination base station, the relay station transmits, to the destination base station, neighboring base station information including information whether each of a plurality of neighboring base stations is capable of establishing a wireless communication with the relay station, and the neighboring base station information is configured to be used by the destination base station, for detecting a disconnection of a wireless communication between the destination base station and the relay station, for transmitting, after the disconnection is detected, from the destination base station to each of the plurality of neighboring base stations, an inquiry whether a respective neighboring base station is connected with the relay station through wireless communication between the respective neighboring base station and the relay station, for receiving, from the each of the plurality of neighboring base stations, a response whether the respective neighboring base station is connected with the relay station through the wireless communication between the respective neighboring base station and the relay station, for determining that a malfunction of the relay station has occurred, when there is no response, from the plurality of the neighboring base stations, that the respective neighboring base station is connected with the relay station through the wireless communication between the relay station and the neighboring base station, in response to the transmitted inquiry, and for determining that a malfunction of the relay station has not occurred, when there is at least one response from the plurality of the neighboring base stations, that the respective neighboring base station is connected with the relay station through the wireless communication between the relay station and the respective neighboring base station.

* * * * *